Jan. 11, 1955 M. G. KROGER ET AL 2,699,463
NOISE INVERTER CIRCUITS
Filed June 28, 1952
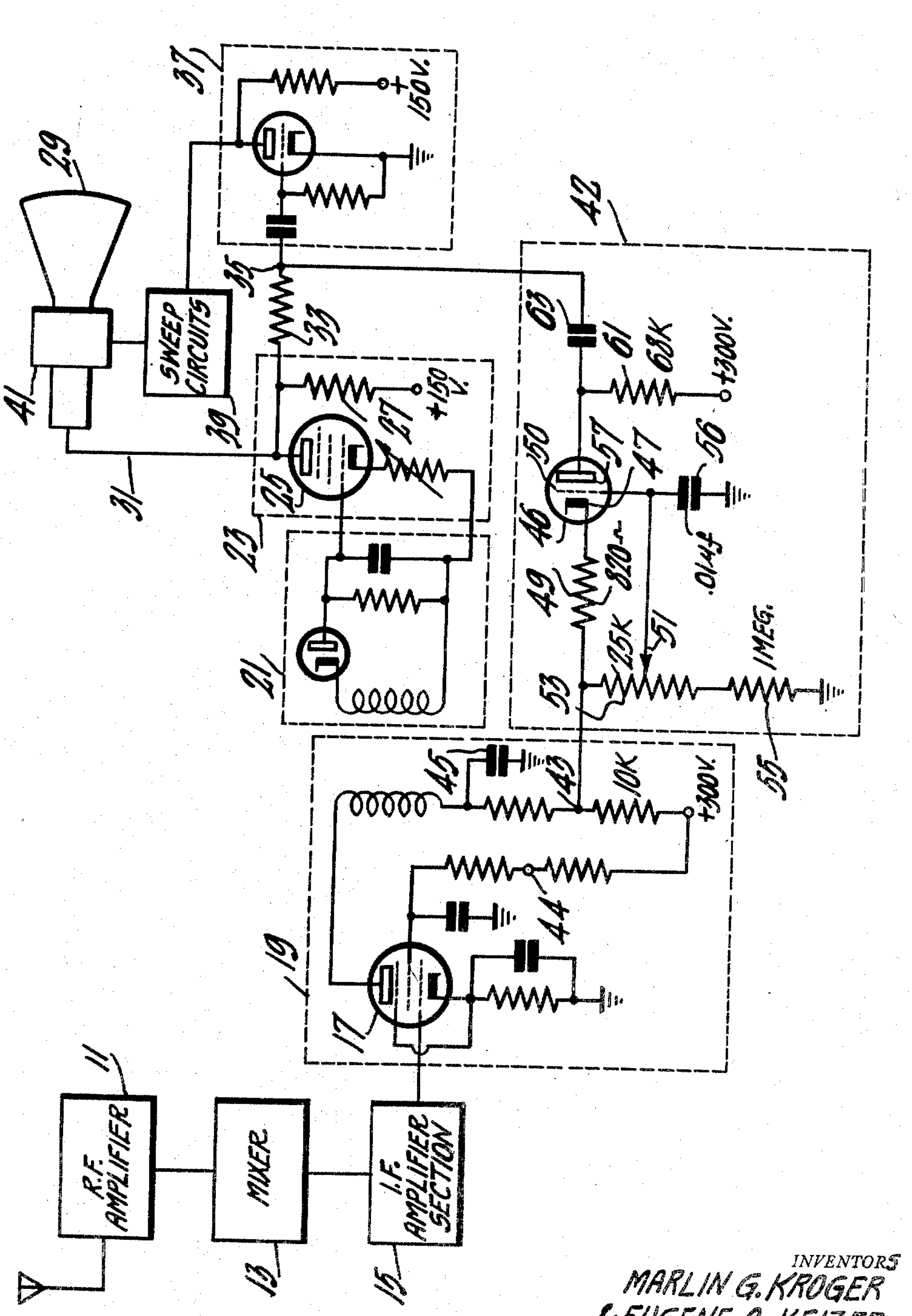
INVENTORS
MARLIN G. KROGER
& EUGENE O. KEIZER
BY [signature]
ATTORNEY

United States Patent Office

2,699,463

Patented Jan. 11, 1955

2,699,463

NOISE INVERTER CIRCUITS

Marlin G. Kroger and Eugene O. Keizer, Princeton, N. J., assignors to Radio Corporation of America, a corporation of Delaware Application June 28, 1952, Serial No. 296,153

4 Claims. (Cl. 178—69.5)

The present invention relates to circuits designed to reduce or eliminate the effects of noise in television receivers.

A copending U. S. patent application of Jack Avins, Serial Number 226,712 filed May 16, 1951, discloses a circuit in which improved noise immunity is obtained by providing a noise inverter tube between the input and the output of a video amplifier. This noise inverter tube is biased to conduct when a noise pulse whose amplitude extends beyond the level of the synchronizing pulses is present at the input of the noise inverter tube, thus producing an inverted noise pulse which reverses the polarity of the noise pulse which would otherwise be present at the output of the video amplifier.

Some of the design considerations attendant to this noise inverter type of circuit are the following: it is desirable to bias the noise inverter tube so that it will start to conduct just beyond the sync tips. This is so because if the level at which the noise inverter tube starts to conduct is kept way beyond the sync tips, there will be no cancellation of noise lying between the sync tips and that level. It is also highly desirable to make sure that under any conditions the noise inverter tube will not amplify the sync pulses fully. This is so because, should the noise inverter tube amplify the sync pulses fully, cancellation of sync would take place and the receiver would be in a "locked-out" condition.

It is an object of this invention to improve the immunity to noise of television receivers.

It is another object of the present invention to prevent a noise inverter type of circuit from cancelling sync pulses.

In accordance with the present invention, the cathode of the noise inverter tube is connected to a point in the circuit of an I. F. amplifier so that the I. F. amplifier tube is part of the cathode resistance of the noise inverter tube. In the presence of noise the I. F. amplifier tube conducts fully, and the cathode resistance of the noise inverter tube is decreased: the noise inverter tube has a high amplification ratio and noise cancellation or inversion occurs. Should the noise inverter tube conduct sync pulses, the I. F. amplifier does not conduct fully, and the cathode resistance of the noise inverter tube is higher than it is in the presence of noise: the noise inverter tube then has an amplification ratio which is low enough to prevent the cancellation of sync pulses.

Other and incidental objects of the present invention will be apparent to those skilled in the art from a reading of the following specification and an inspection of the accompanying drawing which illustrates one embodiment of the present invention.

Referring to the drawing, there is shown a television receiver which includes an R. F. amplifier 11, a mixer 13, and an I. F. amplifier section 15. The last I. F. amplifier, comprising tube 17 and its associated circuitry, is enclosed in the dashed rectangle 19. The output of the last I. F. amplifier 19 is transformer-coupled to a video detector 21, the output of which is fed to a video amplifier 23 which includes a tube 25 and a load resistor 27. The output of the video amplifier 23 is applied in a conventional manner to a kinescope 29 by means of lead 31, and through an isolating resistor 33 to the input terminal 35 of a synchronizing signal separator 37. The output of the synchronizing signal separator 37 is fed to the sweep circuits 39. The sweep circuit 39 produce deflection voltages which are applied to the deflection yoke 41. The circuits so far described are conventional, and well known to those skilled in the art.

In accordance with the illustrated embodiment of the present invention, a noise inverter circuit 42 is connected between a point 43 in the circuit of the I. F. amplifier 19 and the input terminal 35 of the synchronizing signal separator 37.

Point 43 is a point in the circuit of one of the I. F. amplifier. It need not be in the circuit of the last I. F. amplifier: it may be in the circuit of one of the other I. F. amplifiers. Point 43 should satisfy the following requirement: it should be a point whose potential level falls to a lower value due to increased conduction of the I. F. amplifier tube in response to noise pulses. Point 43 is shown located in the anode circuit of the I. F. amplifier tube 17. Point 43 could also be located in the screen grid circuit of the I. F. amplifier tube at a point shown at 44. The term "electron collecting electrode" will be used in some of the claims to indicate to which electrode of the I. F. amplifier point 43 is connected, the above term being intended to be generic to the anode and the screen grid of the I. F. amplifier tube.

The potential present at point 43, when the receiver is operating, is a substantially uniform D. C. potential, the intermediate frequencies (I. F.) having been by-passed to ground by capacitor 45. However noise impulses which tend to increase the conduction in tube 17, are not by-passed to ground by capacitor 45, and are present at point 43 in the form of negative going pulses.

These noise pulses, after going through the detector 21 and the video amplifier 23, appear as positive going pulses at the input terminal 35 of the synchronizing signal separator 37.

The noise inverter circuit 42 comprises a unilateral conduction device 46 whose cathode 47 is connected to point 43 through a resistor 49. Resistor 49 functions as an isolating resistor for whatever residue of intermediate frequencies (I. F.) which has not been by-passed to ground through capacitor 45. Thus the negative going noise pulses present at point 43 are applied to the cathode 47, and tend to increase conduction in the unilateral conduction device 46.

The unilateral conduction device 46 has a control electrode 50 which is connected to the movable tap 51 of a potentiometer 53. The potentiometer 53 is connected, in series with a resistor 55, between point 43 and ground. It will be seen that the static potential at the control electrode 50 will be determined by the portion of movable tap 51 on the potential divider formed by potentiometer 53 and resistor 55. For the position of tap 51 shown in the drawing, the static potential on the control electrode 50 is lower (less positive) than the static potential at the cathode 47. By means of the movable tap 51, the unilateral conduction device 46 may be biased so that it will conduct in the presence of impulse noise, and not in the presence of sync. A capacitor 56 is connected between the control electrode 50 and ground.

The anode 57 of the unilateral conduction device 46 is connected to a point of positive potential through a load resistor 61, and to the input terminal 35 of the synchronizing signal separator 37 through a blocking capacitor 63.

Noise impulses are present at a point 43 in the presence of negative going pulses. These negative going pulses lower momentarily the potential of the cathode 47 while the potential of the control electrode 50 does not change appreciably due to the RC combination comprising capacitor 56 and potentiometer 53. Noise impulses thus cause the unilateral conduction device 46 to conduct. When the unilateral conduction device 46 conducts there is produced across resistor 33 negative noise pulses which is in opposite phase to the positive noise pulse that will have reached resistor 33 through the video amplifier tube 25, and substantial cancellation will take place. This action does not require a critical balance between the two pulses: the negative noise pulse developed by the noise inverter tube 42 at anode 57 will generally exceed the positive noise pulse produced at the same point by the video amplifier. This will momentarily drive the grid of the tube included in the sync separator circuit 37 more negative than is necessary to obtain noise immunity. "White" noise pulses will generally be introduced by the noise inverter 42 at anode 57, but there "white" pulses will be attenuated sufficiently when they reach the anode of the video amplifier tube 25 so that "white" noise in the picture will not be observed when the noise inverter 42 conducts on noise impulses. The amount of attenuation provided increases as the ratio R33/R27 increases.

In accordance with the illustrated embodiment of present invention, the cathode resistance to ground of the unilateral conduction device 46 includes two paths in parallel. One path is a high impedance path through potentiometer 53 and resistor 55. Another path, of much lower impedance, is through the I. F. amplifier tube 17. This latter path is a variable resistance path, its resistance being considerably lower in the presence of noise impulses (when the tube 17 is fully conducting) than when the signal alone is present. Thus the unilateral conduction device 46 will amplify noise pulses considerably more than it will amplify sync pulses, should sync pulses ever cause it to conduct. The unilateral conduction device 46 will have an amplification factor high enough, in the presence of noise pulses, so that cancellation or inversion of noise will take place at the input terminal 35; and a lower amplification factor, low enough so that cancellation of synchronizing pulses will not take place when synchronizing pulses alone are present.

What is claimed is:

1. In a signal receiver adapted to receive signals having a recurrent synchronizing pulse component, an intermediate frequency amplifier comprising an electron tube having a space current path whose resistance is variable, means to apply signals to said intermediate frequency amplifier so that the resistance of said space current path is considerably lower in the presence of noise pulses than it is in the presence of signal only, a synchronizing signal separator having an input terminal, means including a detector and a video amplifier connected between said intermediate frequency amplifier and the input terminal of said synchronizing signal separator to apply signals including noise pulses thereto, a noise inverter circuit comprising a unilateral conduction device having a cathode and an electron collecting electrode, means connecting the electron collecting electrode of said unilateral conduction device to the input terminal of said synchronizing signal separator, and means to include the space current path of said intermediate frequency amplifier tube in the cathode circuit of said unilateral conduction device.

2. In a signal receiver adapted to receive signals having a recurrent synchronizing pulse component, an intermediate frequency amplifier comprising an electron tube having a space current path whose resistance is variable, means to apply signals to said intermediate frequency amplifier so that the resistance of said space current path is considerably lower in the presence of noise pulses than it is in the presence of signal only, a synchronizing signal separator having an input terminal, means including a detector connected between said intermediate frequency amplifier and the input terminal of said synchronizing signal separator to apply thereto signals including noise pulses having a given polarity, a noise inverter circuit comprising a unilateral conduction device having a cathode and an electron collecting electrode, and means to include the space current path of said intermediate frequency amplifier tube in the cathode circuit of said unilateral conduction device so that said unilateral conduction device has an amplification factor which is considerably higher when noise pulses are applied thereto than when signal only is applied thereto, and means connecting the electron collecting electrode of said unilateral conduction device to the input terminal of said synchronizing signal separator to apply thereto noise pulses of a polarity opposite to the polarity of the noise pulses applied thereto through said detector.

3. In a noise cancellation circuit for a signal communication system, the combination of: an amplifier means designated to conditionally deliver an output signal having noise components; an amplifier output signal utilization means connected with said amplifier means; a signal mixing means connected between said amplifier means and said utilization means; variable gain signal communicating means connected with said amplifier means and said mixing means for delivering to said mixing means noise signals in cancelling phase relation to noise signals reaching said mixer and delivered by said mixer to said signal utilization means; means included in said amplifier means for developing a gain control potential in accordance with noise signals communicated by said amplifier means; and a connection from said last named means to said variable gain signal communicating means for controlling the gain thereof.

4. In a signal amplifying system, the combination of: a driver amplifier having variable power supply demands as a function of signal level passing therethrough, said driver amplifier having an output circuit; a variable gain signal amplifier having its input circuit coupled with said amplifier, said signal amplifier also having an output circuit; signal mixing means coupled with the output circuits of said driver and said signal amplifiers such as to combine signals delivered by said amplifiers in a cancelling relationship to one another; means coupled with said driver amplifier and responsive to the power demands thereof to develop a control signal; and a connection from said last named means to said variable gain amplifier to control the gain of said variable gain amplifier in accordance with said control signal.

References Cited in the file of this patent

UNITED STATES PATENTS

| | | |
|---|---|---|
| 2,072,973 | Wilhelm | Mar. 9, 1937 |
| 2,546,972 | Chatterjea | Apr. 3, 1951 |